(12) United States Patent
Ramesh et al.

(10) Patent No.: US 9,712,393 B2
(45) Date of Patent: Jul. 18, 2017

(54) NETWORK LOOP PREVENTION

(71) Applicant: Avaya Inc., Basking Ridge, NJ (US)

(72) Inventors: Deepak Ramesh, Bangalore (IN);
Sudhakar Biradar, Bangalore (IN);
Vinuta Karchenappa Shekharappa,
Bangalore (IN)

(73) Assignee: Avaya Inc., Santa Clara, CA (US)

( * ) Notice: Subject to any disclaimer, the term of this patent is extended or adjusted under 35 U.S.C. 154(b) by 467 days.

(21) Appl. No.: 14/054,821

(22) Filed: Oct. 15, 2013

(65) Prior Publication Data

US 2015/0103674 A1    Apr. 16, 2015

(51) Int. Cl.
*H04L 1/00*     (2006.01)
*H04L 12/26*    (2006.01)
*H04L 12/24*    (2006.01)
*H04L 12/46*    (2006.01)

(52) U.S. Cl.
CPC ............ *H04L 41/12* (2013.01); *H04L 12/467* (2013.01)

(58) Field of Classification Search
None
See application file for complete search history.

(56) References Cited

U.S. PATENT DOCUMENTS

| | | | |
|---|---|---|---|
| 7,672,241 B2 * | 3/2010 | Foore | H04W 28/08 370/235 |
| 8,107,382 B2 * | 1/2012 | Lin | H04L 12/2697 370/244 |
| 8,705,393 B2 * | 4/2014 | Kwon | H04L 1/1607 370/252 |

FOREIGN PATENT DOCUMENTS

JP    2006217496 A  *  8/2006  ............. H04L 12/46

* cited by examiner

*Primary Examiner* — Yemane Mesfin
*Assistant Examiner* — Abdelillah Elmejjarmi (57) ABSTRACT

Systems, methods and computer readable media for network loop detection and prevention are described. Some implementations can include a computerized method comprising detecting, at a first switch, a loop condition in a network, and generating, at the first switch, a localize loop message having an instance count and a path list. The method can also include setting, at the first switch, the instance count of the localize loop message to a first value, and transmitting, from the first switch, the localize loop message to a second switch. The method can further include detecting, at the second switch, a loop in the network; and sending, from the second switch, a localize loop response message to the first switch.

20 Claims, 8 Drawing Sheets

NETWORK LOOP PREVENTION

FIELD

Embodiments relate generally to computer networks and, more particularly, to systems, methods and computer readable media for network loop prevention.

BACKGROUND

Some conventional computer networks implementing the simple loop prevention protocol (SLPP) may only isolate loops by disabling a port when the system detects a loop, but may not be able to eliminate all the loops in all parts of the network at the most granular level. Disabling of a port based on which port is disabled in the network to isolate the loop it may affect traffic from reaching other parts of network where there are no loops. Also with some conventional loop prevention protocols, the messages sent to detect loops can themselves cause a broadcast storm and loop in the network as these messages may be sent via a multicast MAC method and may have no mechanism to stop after reaching a maximum hop limit, for example.

Embodiments were conceived in light of the above-mentioned problems and limitations among other things.

SUMMARY

Some implementations can include a computerized method comprising detecting, at a first switch, a loop condition in a network via standard SLPP packet processing and generating, at the first switch, a localize loop message having an instance count and a path list. The method can also include setting, at the first switch, the instance count of the localize loop message to a first value and transmitting, from the first switch, the localize loop message to a second switch. The method can further include detecting, at the second switch, a loop in the network and sending, from the second switch, a localize loop response message to the first switch. The method can also include transmitting from first switch a new localize loop message with instance count incremented when the first switch receives a localize loop response from the second switch and determining when to stop sending localize loop messages after a time out period when the first switch does not receive any further localize loop responses from the second switch. The method can further include resuming, at the first switch, standard SLPP packet processing.

The method can also include receiving, at the second switch, the localize loop message, and updating, at the second switch, the path list of the localize loop message. The method can further include transmitting, from the second switch, the localize loop message to ports associated with the second switch, and receiving, at the second switch, returned localize loop messages. The method can also include evaluating, at the second switch, the path list of each returned localize loop message to determine if a loop condition exists. The method can further include shutting down a port in response to determining a loop condition exists, and sending to the first switch a unicast message indicating which port has been shutdown for a given instance count. The method can also include determining to flood localize loop packets only once for a given instance count, and assigning ports a priority value and when localize loops packets are received on multiple ports of the second switch shutting down ports in ascending order of port priorities for different instance counts.

The localize loop message can include a modified simple loop prevention loop message. The ports associated with the second switch can include VLAN ports. The path list can include MAC addresses. The localize loop message response can include an indication for ports which have been shut down.

The method can also include generating, at the first switch, a subsequent localize loop message with an incremented instance count. The method can further include transmitting, from the first switch, the localize loop message with an incremented instance count to the second switch.

Some implementations can include a system comprising one or more processors configured to perform operations. The operations can include detecting, at a first switch, a loop condition in a network. The operations can also include generating, at the first switch, a localize loop message having an instance count and a path list. The operations can further include setting, at the first switch, the instance count of the localize loop message to a first value. The operations can also include transmitting, from the first switch, the localize loop message to a second switch, and detecting, at the second switch, a loop in the network. The operations can further include sending, from the second switch, a localize loop response message to the first switch.

The detecting a loop at the second switch, can further comprise receiving, at the second switch, the localize loop message, and updating, at the second switch, the path list of the localize loop message. The method can also include transmitting, from the second switch, the localize loop message to ports associated with the second switch, and receiving, at the second switch, returned localize loop messages. The method can further include evaluating, at the second switch, the path list of each returned localize loop message to determine if a duplicate identifier exists.

The localize loop message can include a modified simple loop prevention loop message. The ports associated with the second switch can include VLAN ports. The path list can include MAC addresses. The localize loop message response can include an indication for ports which have been shut down.

The operations can also include generating, at the first switch, a subsequent localize loop message with an incremented instance count. The method can further include transmitting, from the first switch, the localize loop message with an incremented instance count to the second switch.

Some implementations can include nontransitory computer readable medium having software instruction stored thereon that, when executed by a processor, cause the processor to perform operations. The operations can include detecting, at a first switch, a loop condition in a network. The operations can also include generating, at the first switch, a localize loop message having an instance count and a path list. The operations can further include setting, at the first switch, the instance count of the localize loop message to a first value. The operations can also include transmitting, from the first switch, the localize loop message to a second switch, and detecting, at the second switch, a loop in the network. The operations can further include sending, from the second switch, a localize loop response message to the first switch.

The detecting a loop at the second switch, can further comprise receiving, at the second switch, the localize loop message, and updating, at the second switch, the path list of the localize loop message. The method can also include transmitting, from the second switch, the localize loop message to ports associated with the second switch, and receiving, at the second switch, returned localize loop messages. The method can further include evaluating, at the second switch, the path list of each returned localize loop message to determine if a duplicate identifier exists.

The localize loop message can include a modified simple loop prevention loop message. The ports associated with the second switch can include VLAN ports. The path list can include MAC addresses. The localize loop message response can include an indication for ports which have been shut down.

The operations can also include generating, at the first switch, a subsequent localize loop message with an incremented instance count. The method can further include transmitting, from the first switch, the localize loop message with an incremented instance count to the second switch.

DETAILED DESCRIPTION

Figure 1:
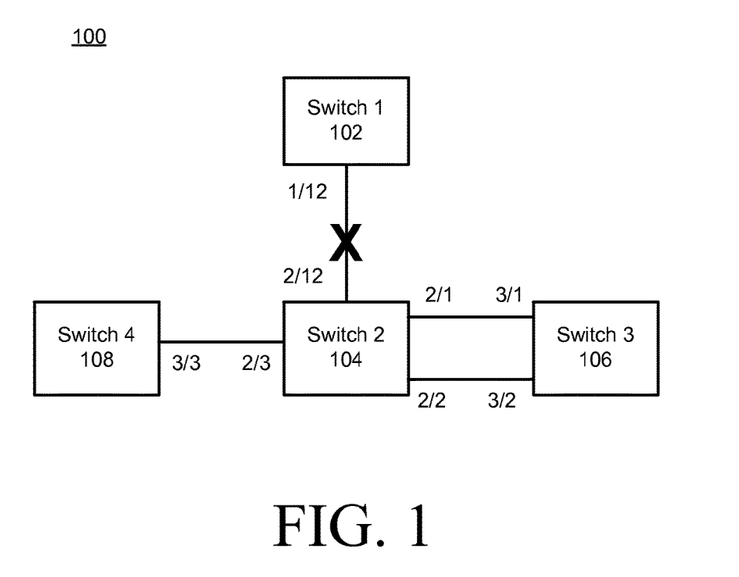
FIG. 1 is a diagram of an example network exhibiting conventional loop behavior.

FIG. 1 shows an example network 100 including a first switch 102, a second switch 104, a third switch 106, and a fourth switch 108.

In operation, the first switch 102 sends out a simple loop protocol message (e.g., an SLPP PDU) on VLAN 20 via port 1/12. The second switch 104 receives the SLPP message on port 2/12 and forwards SLPP message out via ports 2/1 and 2/2.

The third switch 106 receives the SLPP message on its ports 3/1 and 3/2 and in turn forwards the SLPP message back to the second switch 104 on ports 3/1 and 3/2. The second switch 104 receives the SLPP message on 2/1 and 2/2 and forwards them on 2/2, 2/1 and 2/12.

The first switch receives the SLPP message which it originated itself and brings down the link 1/12.

In this case, the SLPP messages will keep looping between the second switch 104 and the third switch 106 as the loop between these two switches still exists. Also, the fourth switch to first switch traffic may be affected even though the loop is between the second switch and the third switch as the link between the first switch 102 and the second switch 104 has been shut down. Thus, the fourth switch 108 may be completely isolated from the rest of the LAN as the first switch 102 to second switch 104 link has been shut down.

Figure 2:
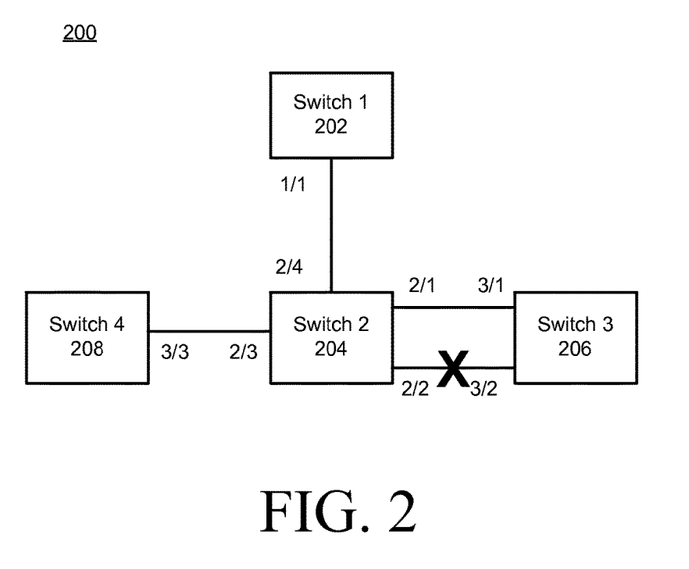
FIG. 2 is a diagram of an example network in accordance with at least one embodiment.

FIG. 2 shows an example network 200 including a first switch 202, a second switch 204, a third switch 206, and a fourth switch 208.

In operation, the first switch 202 sends out an SLPP message on VLAN 20 via port 1/1. The second switch 204 receives the SLPP message via port 2/4 and forwards the SLPP message on its ports 2/1 and 2/2.

The third switch 206 receives the SLPP message on its ports 3/1 and 3/2 and forwards the SLPP message back to the second switch 204 on ports 3/1 and 3/2. The second switch 204 receives the SLPP message on ports 2/1 and 2/2 and forwards the messages on ports 2/3 and 2/4.

The first switch 202 receives the SLPP message via port 1/1 which it originated and thus detects a loop condition. The first switch 202 then generates a localize loop SLPP message (e.g., a modified SLPP message) including an instance count and a path list. The instance count is set to 1.

The first switch 202 does not shut down link 1/1. Instead, the first switch 202 sends out the localize loop SLPP message to the second switch 204. The second switch 204 receives the localize loop SLPP message and updates the path list with its ingress port MAC address (2/4) and forwards the packets on all ports of the VLANs associated with switch 2.

The third switch 206 receives the localize loop SLPP message and updates its ingress port MAC (3/1) on the path list and forwards the packet on all ports of the VLAN. The second switch 204 gets the localize loop SLPP packets back and scans through the path list to determine whether there are any MACs in the path list that belong to the second switch. The second switch 204 determines that there are two MACs in the path list that belong to it and thus can determine that a loop condition exists between the second switch 204 and the third switch 206. The second switch can shut down port 2/2 going between the second and third switches.

The second switch 204 can then send a unicast SLPP localize loop response message back to the originator switch (the first switch 202) which will include a path list with ports with MAC addresses of 2/4, 3/1 and 2/2. The unicast SLPP response message will also include a shutdown bit marked for port 2/2 as the second switch 204 has shut down the port 2/2 to the third switch 206.

The first switch gets a response for the localize loop SLPP message and checks whether any of the ports in the path list have been shut down and thus can determine that the loop has not been eliminated by a downstream switch. The first switch 202 upon receipt of the response for the localize loop SLPP message with an instance count one and then sends a second or next localize loop message with an instance count incremented to two. The incremented instance count and the subsequent localize loop messages allows downstream switches to detect and eliminate any more loops that may not have been eliminated with the first instance of the localize loop SLPP message. In other words, the loop elimination process can proceed in an iterative fashion.

The first switch 202 can keep sending localize loop SLPP messages with subsequently incrementing instance counts on reception of a response for a localize loop message from its downstream switches.

The first switch 202 can wait for a user to find timeout period for which it expects a response back from the localize loop SLPP message from downstream switches. If the first switch does not receive any response messages from localize loop SLPP message from the downstream switches, they can be determined that there are no further loops in the network and the first switch can start sending regular SLPP messages again which are only bridged by downstream switches.

Further, each downstream switch may only forward localize loop SLPP messages once for any given instance count.

In other words, the second switch 204 may get back a localize loop SLPP message on port 2/2 and will not forward this packet again on all ports of the VLAN. Thus, this will eliminate localize loop SLPP messages from looping and generating multiple copies.

Also, each downstream switch may only take action independently and may shut down only one port per switch per instance count of an SLPP message. If a switch receives more than one localize loop SLPP message of a given instance and if the switch has already taken action on the first packet received, then the switch may ignore the other localize loop SLPP messages received for a given instance count. This can permit serialization of shutting down ports when multiple localize loops SLPP messages are received on multiple ports. Serialization of shutting down ports can be important otherwise the system may end up shutting down all ports on a switch and isolating certain LAN segments. Ports can be assigned a priority and the shutting down of ports can occur in ascending (or descending) order of priority as may be appropriate for a given implementation.

After shutting down the link, downstream switches can send a unicast response to a localize loop packet back to the originator switch with the action taken information and the path list information. This can help the originator switch to determine if downstream switches have detected and taken any action to eliminate loops, thus the originator switch can stop sending localize loop SLPP messages and start sending regular or conventional SLPP messages which then are bridged by downstream switches.

If there are multiple loops among switches, those will be localize and eliminated in the subsequent localize loop SLPP messages which have the subsequent instance count in multiple iterative steps. All switches can generate a trap message to the user indicating the path of the loop and the action taken information about which port or ports are shut down.

Figure 3:
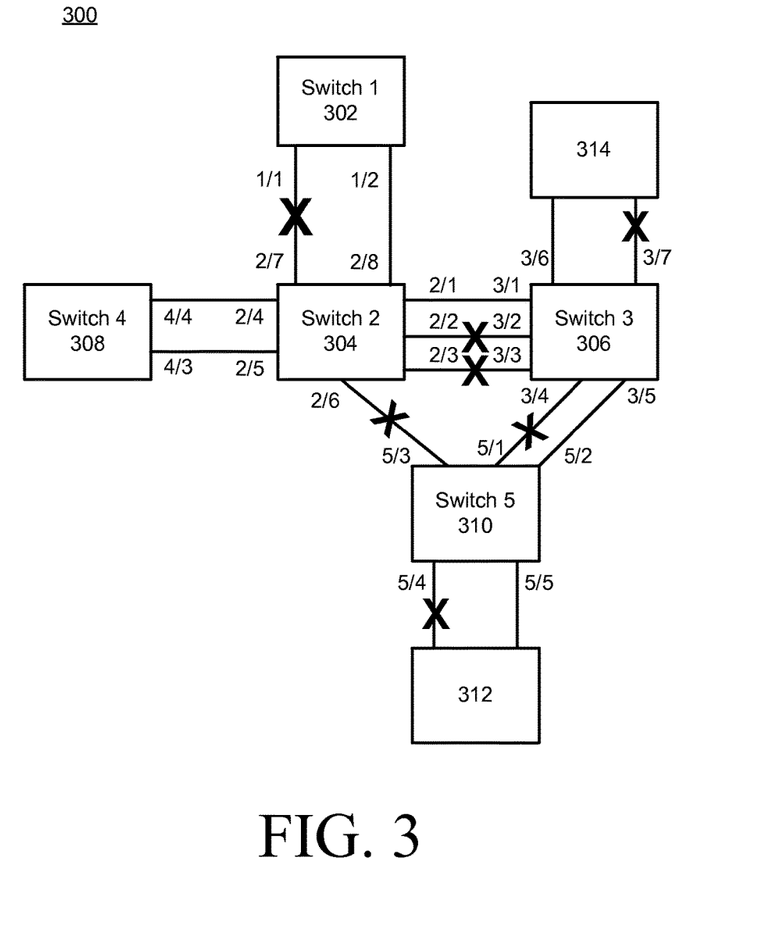
FIG. 3 is a diagram of an example network showing complex loop prevention in accordance with at least one embodiment.

FIG. 3 shows an example complex network topology and illustrates how localization and elimination of loops using localize loop SLPP messages can work when an originator switch gets back a response for the localize loop SLPP messages in iterative. The network 300 can include a first switch 302, a second switch 304, a third switch 306, a fourth switch 308, a fifth switch 310, a server 312, and another network mode 314.

An operation in a first instance count (e.g., instance count of 1) the following loops can be eliminated: 2/8, 1/1; 2/8, 3/1, 2/2; 2/8, 3/1, 3/7; 2/8, 3/1, 5/2, 3/4; 2/8, 5/3, 5/4.

In the second iteration (e.g., an instance count of 2) the following loops can be eliminated: 2/8, 3/1, 2/3; 2/8, 3/1, 5/2, 3/4.

And in a third iteration (e.g., an instance count of 3) the following loops can be eliminated: 2/8, 3/1, 5/2, 2/6.

Figure 4:
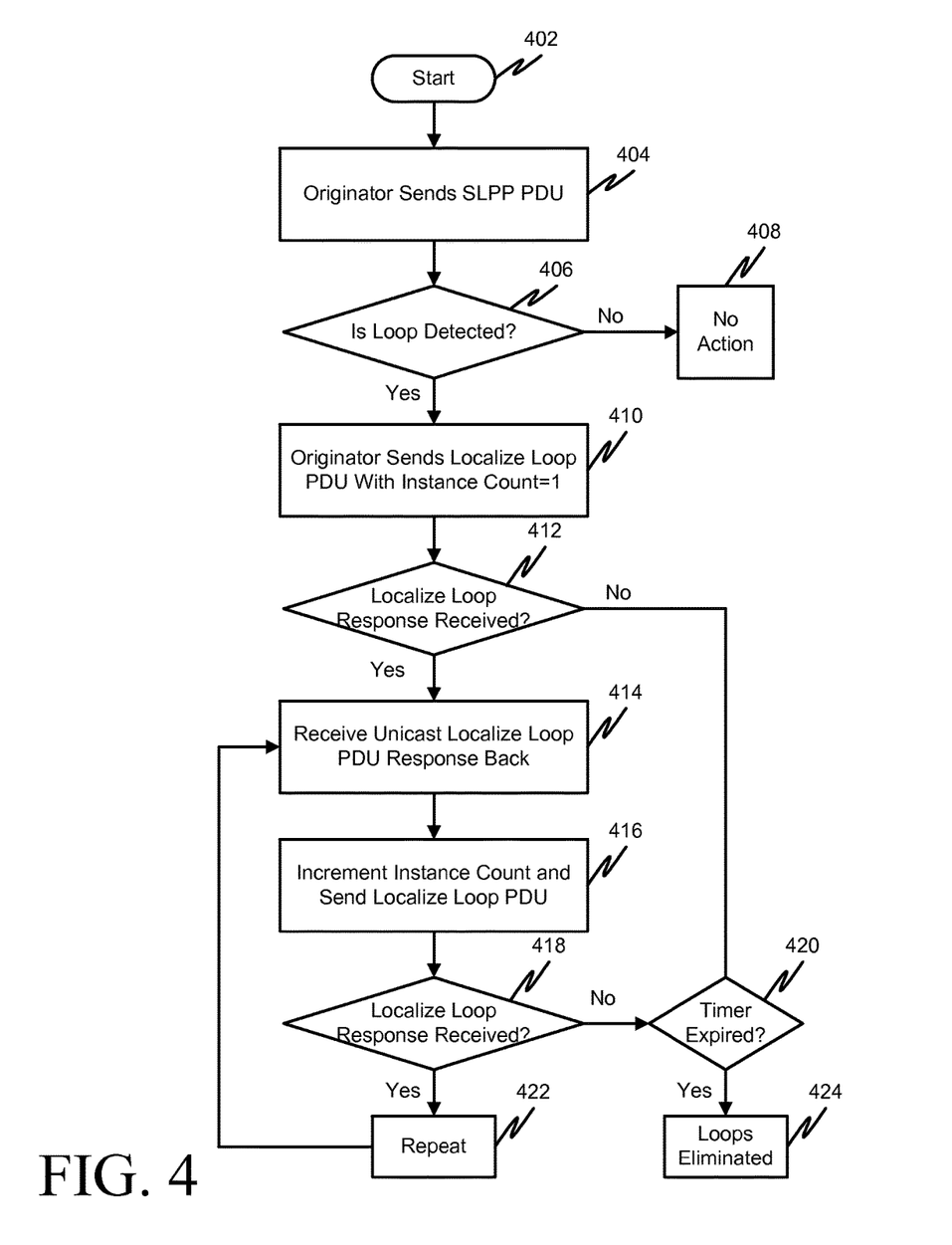
FIG. 4 is a flow chart showing an example method for loop prevention in accordance with at least one embodiment.

FIG. 4 shows an example flow chart for a method of network loop prevention in accordance with at least one embodiment. Processing begins at 402 and continues to 404, where a first switch (e.g., 202 or 302) sends out an SLPP PDU. Processing continues to 406.

At 406, the originator determines if a loop is detected. If so, processing continues to 410. If not, processing continues to 408, where no further action is taken for the current session of loop detection.

At 410, the originator switch generates and sends a localize loop message having an instance count and a path list. The originator switch sets an instance count of the localize loop message to a first value (e.g., 1). The localize loop PDU can be sent out on all ports of a VLAN. The localize loop PDU can be used by downstream switches to detect and eliminate loops in the network. Processing continues to 412.

At 412, the originator determines if a localize loop message response has been received. If yes, processing continues to 414. If no, processing continues to 420.

At 414, the originator switch receives a unicast localize loop response back from a downstream switch. The response includes a port list with MAC addresses so that the originator switch can set a "Shutdown" bit against any ports that have been shut down by downstream switches. Processing continues to 416.

At 416, the localize loop originator switch can send another localize loop PDU with an incremented instance count. Processing continues to 418.

At 418, the originator determines is a localize loop response was received. If yes, then processing continues to 422. If no, then processing continues to 420.

At 420, the originator switch determines if a timer has expired. If yes, then the system can determine that loops have likely been eliminated in the network (424). If no, then processing continues to 412.

During the localize loop message processing, a downstream switch can detect a loop. The detection of a loop by a downstream switch can include receiving the localize loop message at the downstream switch and updating the path list associated with the localize loop message. Also, the downstream switch can transmit the localize loop message from the downstream switch to ports associated with the downstream switch, for example, on all ports of a VLAN. The downstream switch can receive return localize loop messages and evaluate the path list to determine if a loop is present (e.g., if there are two MACs on the path list associated with the second switch).

The above steps can be repeated iteratively in whole or in part in order to accomplish a network loop prevention task.

Figure 5:
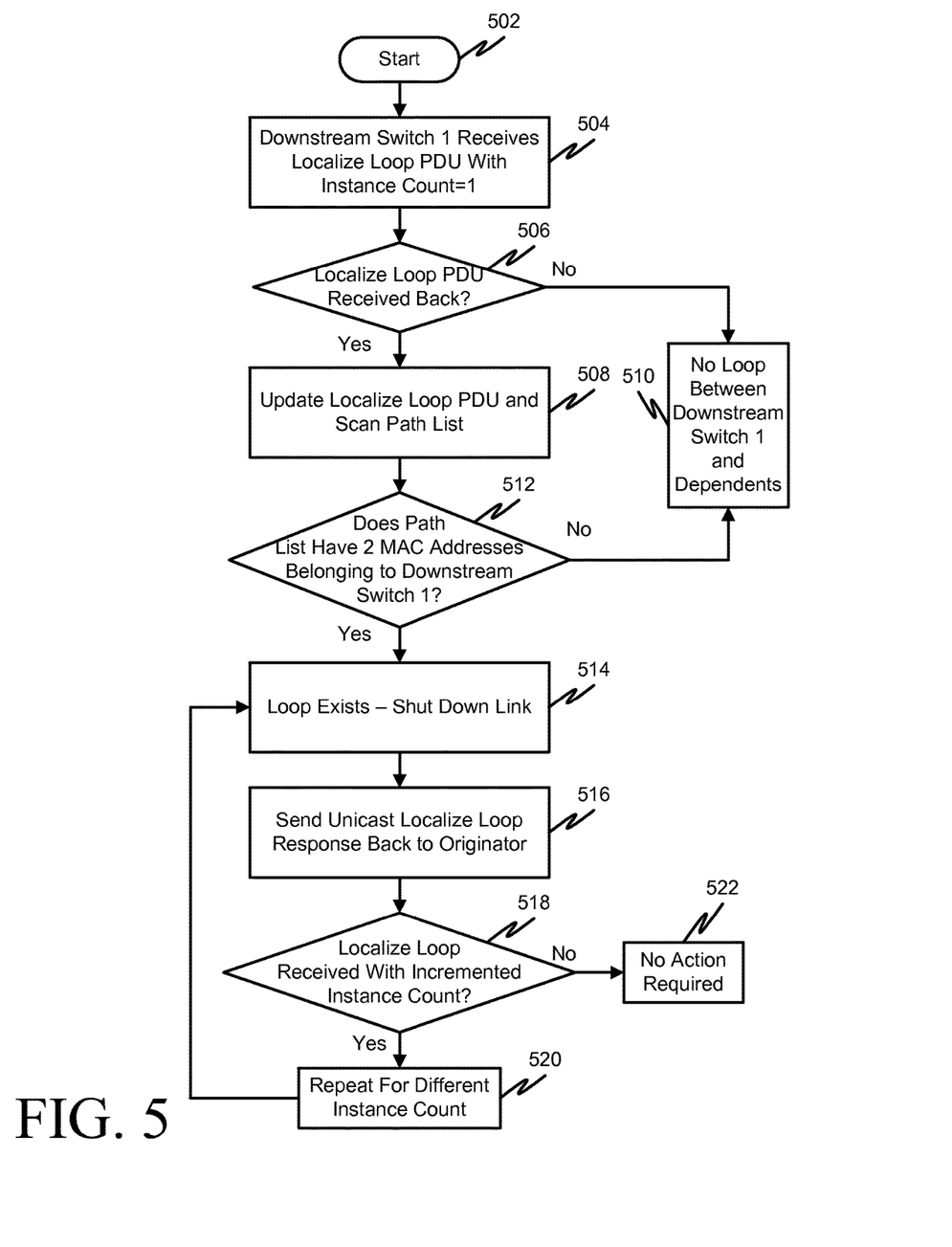
FIG. 5 is a flow chart showing an example method for loop prevention in accordance with at least one embodiment.

FIG. 5 is a flow chart of an example method for loop detection in a downstream switch. Processing begins at 502 and continues to 504 where a downstream switch receives a localize loop message with an instance count of 1 (for example). The downstream switch updates the localize loop PDU with its ingress port MAC address and sends out the localize loop PDU on all ports of the VLAN. Processing continues to 506.

At 506, the downstream switch determines if a localize loop PDU has been received. If yes, processing continues to 508. If no, processing continues to 510.

At 508, the downstream switch updates the ingress port's MAC in the localize loop PDU and scans through the path list. Processing continues to 512.

At 510, it is determined that there are no loops between the downstream switch and its dependents.

At 512, the downstream switch determines whether the path list has 2 MAC address belonging to the downstream switch. If yes, processing continues to 514. If no, processing continues to 510.

At 514, the downstream switch determines that a loop exists between it and a descendant/neighbor switch. The link on which the localize loop PDU was received is shut down. Processing continues to 516.

At 516, the downstream switch sends a unicast localize loop response message to the localize loop originator. The response message includes the port list with MAC addresses. Processing continues to 518.

At 518, the downstream switch determines if a localize loop message with an incremented instance count is received. If yes, processing continues to 520 and on to 514. If no, then processing continues to 522, where no further action is required.

The above steps can be repeated iteratively in whole or in part in order to accomplish a network loop prevention task.

Figure 6:
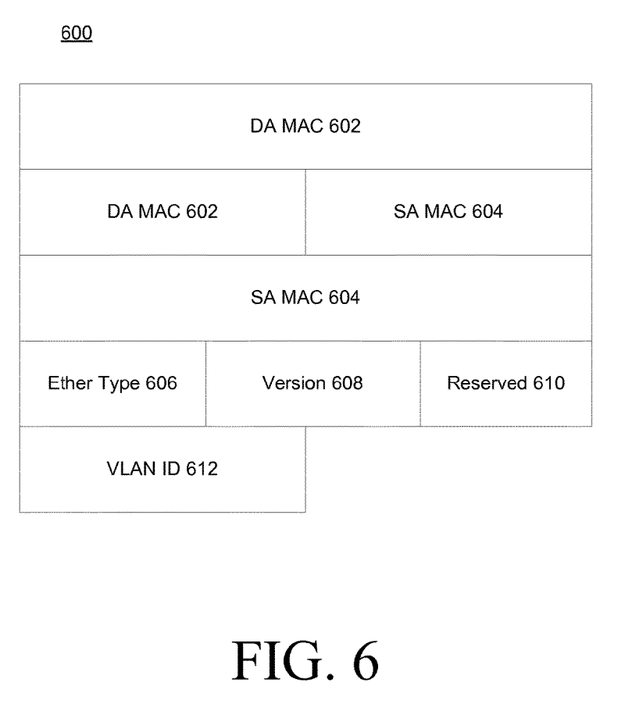
FIG. 6 is a diagram of an existing simple loop prevention protocol method.

FIG. 6 is an example of a conventional SLPP message 600, which includes a destination address MAC 602, a sending address MAC 604, an ether-type 606, a version 608, a reserve section 610, and a VLAN ID 612.

Figure 7:
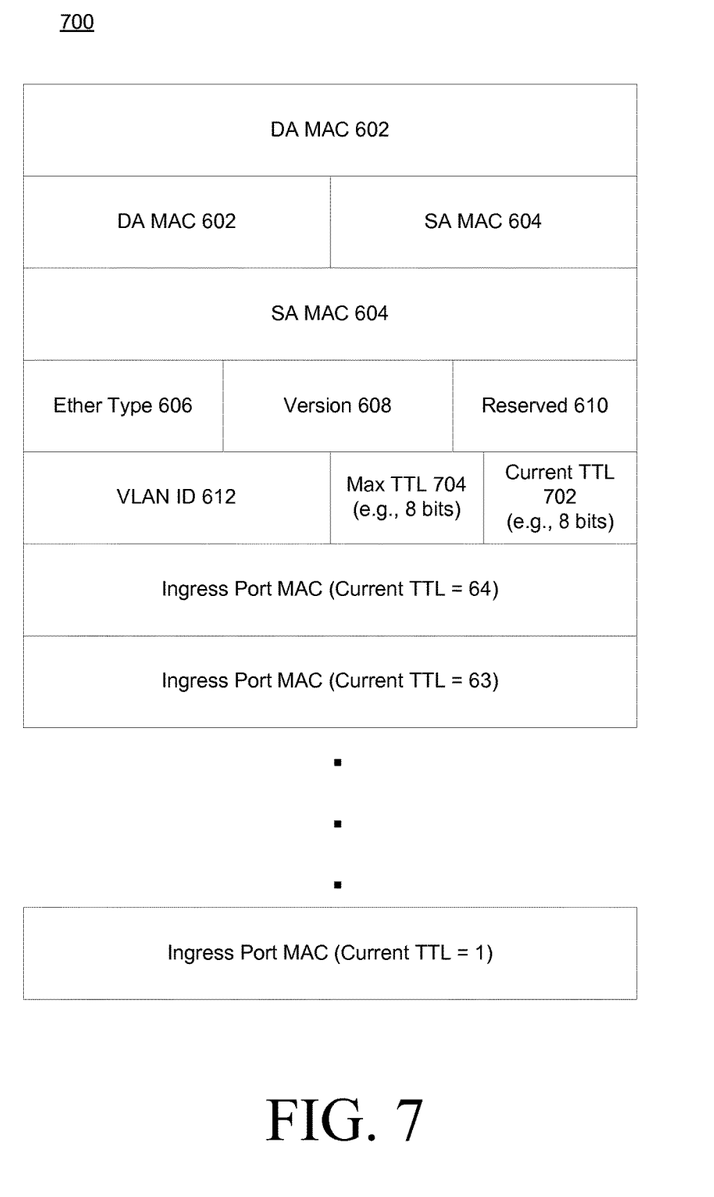
FIG. 7 is a diagram of a modified loop prevention protocol message in accordance with at least one embodiment.

FIG. 7 shows an example localize loop SLPP message. In addition to the fields described above regarding FIG. 5, the localize loop SLPP message also includes a current TTL field 702, a max TTL field 704, an ingress port MAC field which can include a variable number of ingress port MACs comprising a path list.

The current TTL field 702 in the SLPP localize loop message can be used to find the offset where the ingress port MAC needs to be added to the path list. When the current TTL field reaches 64, then the offset at which the ingress port MAC will be inserted is zero. When the current TTL field is 63, then the offset at which the ingress ports MAC will be inserted is 1 and so on. This mechanism of updating ingress port MACs is relatively simple and does not add much overhead to the processing of the SLPP message.

One of the bits in the reserve field can be used to indicate that this is a localize loop type of SLPP message. Further, four bits can be used on the reserve field can be used to indicate the instance count described above, and an action bit can be present against each port MAC.

Figure 8:
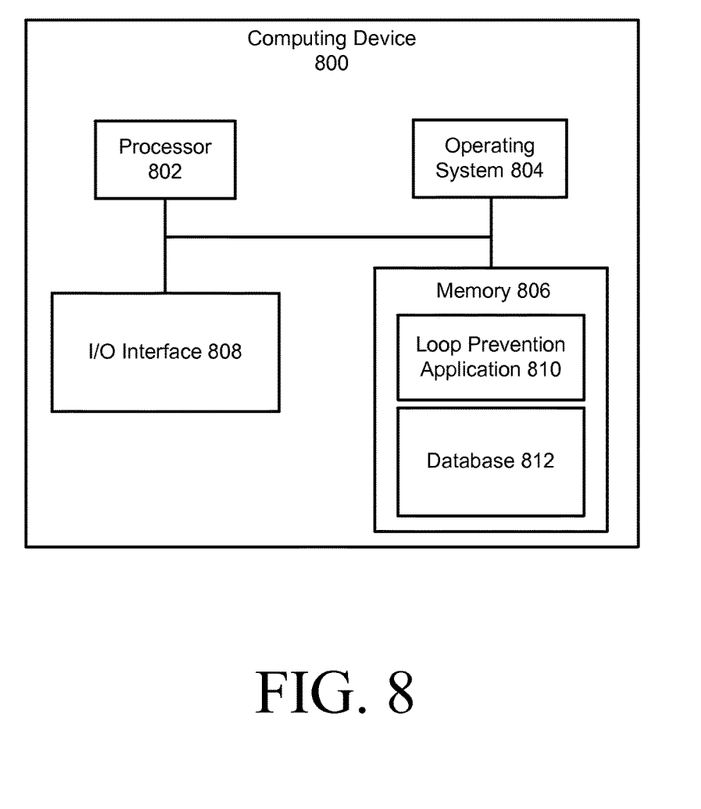
FIG. 8 is a diagram of an example computer system for network loop prevention in accordance with at least one embodiment.

FIG. 8 is a diagram of an example computer system 800 in accordance with at least one implementation. The computer 800 includes a processor 802, operating system 804, memory 806 and I/O interface 808. The memory 806 can include a network loop detection application 810 and a database 812 (e.g., for storing MAC address lists, shutdown ports or the like).

In operation, the processor 802 may execute the application 810 stored in the memory 806. The application 810 can include software instructions that, when executed by the processor, cause the processor to perform operations for loop detection and prevention in accordance with the present disclosure (e.g., performing one or more of the steps in FIG. 4 or 5).

The application program 810 can operate in conjunction with the database 812 and the operating system 804.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, the C#.NET framework, assembly or the like. The instructions can also comprise code and data objects provided in accordance with, for example, the Visual Basic™ language, or another structured, object-oriented, imperative or declarative programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for client location discovery.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A computerized method comprising:
    detecting, at a first switch, a loop condition in a network via standard simple loop prevention protocol (SLPP) packet processing;
    generating, at the first switch, a localize loop message having an instance count and a path list, wherein the instance count contains a unique value corresponding to a given iteration that a localize loop message was transmitted in so as to provide a mechanism for serialization of shutting down ports, and wherein the instance count permits switches to determine the given iteration a given localize loop message was transmitted in, when more than one iteration of localize loop messages is transmitted;
    setting, at the first switch, the instance count of the localize loop message to a predetermined first value that serves as an initial identifier of a first iteration of localize loop messages being transmitted;
    transmitting, from the first switch, the localize loop message to a second switch as the first iteration of localize loop messages being transmitted;
    detecting, at the second switch, a loop in the network;
    sending, from the second switch, a localize loop response message to the first switch;
    incrementing, at the first switch, the predetermined first value of the instance count to generate an incremented instance count;
    transmitting from the first switch a new localized loop message including the incremented instance count when the first switch receives a localize loop response from the second switch, wherein transmitting the new localize loop message comprises a second iteration of localize loop messages being transmitted;
    determining when to stop sending localize loop messages after a time out period when the first switch does not receive any further localize loop responses from the second switch; and
    resuming, at the first switch, standard SLPP packet processing.

2. The method of claim 1, wherein the detecting a loop at the second switch, further comprises:
    receiving, at the second switch, the localize loop message;
    updating, at the second switch, the path list of the localize loop message;
    transmitting, from the second switch, the localize loop message to ports associated with the second switch;
    receiving, at the second switch, returned localize loop messages;
    evaluating, at the second switch, a path list of the returned localize loop messages to determine if a loop condition exists;
    shutting down a port, at the second switch, in response to determining a loop condition exists, wherein the second switch shuts down one port per instance count localize loop message;
    sending to the first switch a unicast message indicating which port has been shutdown for a given instance count;
    determining to forward localize loop packets only once for a given instance count; and
    assigning ports a priority value and when localize loops packets are received on multiple ports of the second switch shutting down ports in ascending order of port priorities for different instance counts.

3. The method of claim 1, wherein the localize loop message includes a modified simple loop prevention loop message.

4. The method of claim 2, wherein the ports associated with the second switch include virtual local area network (VLAN) ports.

5. The method of claim 1, wherein the path list includes media access control (MAC) addresses.

6. The method of claim 2, wherein the localize loop message response includes an indication for ports which have been shut down.

7. The method of claim 1, further comprising:
    generating, at the first switch, a subsequent localize loop message with an incremented instance count; and
    transmitting, from the first switch, the localize loop message with an incremented instance count to the second switch.

8. A system comprising:
    one or more processors coupled to a computer readable medium having stored thereon instructions that, when executed by the one or more processors, cause the processors to perform operations including:
    detecting, at a first switch, a loop condition in a network;
    generating, at the first switch, a localize loop message having an instance count and a path list, wherein the instance count contains a unique value corresponding to a given iteration that a localize loop message was transmitted in so as to provide a mechanism for serialization of shutting down ports, and wherein the instance count permits switches to determine the given iteration a given localize loop message was transmitted in, when more than one iteration of localize loop messages is transmitted;
    setting, at the first switch, the instance count to a predetermined first value that serves as an initial identifier of a first iteration of localize loop messages being transmitted;
    transmitting, from the first switch, the localize loop message to a second switch as the first iteration of localize loop messages being transmitted;
    detecting, at the second switch, a loop in the network;
    sending, from the second switch, a localize loop response message to the first switch;
    incrementing, at the first switch, the predetermined first value of the instance count to generate an incremented instance count;
    transmitting from the first switch a new localized loop message including the incremented instance count when the first switch receives a localize loop response from the second switch, wherein transmitting the new localize loop message comprises a second iteration of localize loop messages being transmitted;

determining when to stop sending localize loop messages after a time out period when the first switch does not receive any further localize loop responses from the second switch; and resuming, at the first switch, standard SLPP packet processing.

9. The system of claim 8, wherein the detecting a loop at the second switch, further comprises:

receiving, at the second switch, the localize loop message;

updating, at the second switch, the path list of in the localize loop message;

transmitting, from the second switch, the localize loop message to ports associated with the second switch;

receiving, at the second switch, returned localize loop messages; and evaluating, at the second switch, a path list of the returned localize loop messages to determine if two or more entries having identifiers associated with the second switch exist in the path list.

10. The system of claim 8, wherein the localize loop message includes a modified simple loop prevention loop message.

11. The system of claim 9, wherein the ports associated with the second switch include virtual local area network (VLAN) ports.

12. The system of claim 8, wherein the path list includes media access control (MAC) addresses.

13. The system of claim 9, wherein the localize loop message response includes an indication for ports which have been shut down.

14. The system of claim 8, wherein the operations further include:

generating, at the first switch, a subsequent localize loop message with an incremented instance count; and transmitting, from the first switch, the localize loop message with an incremented instance count to the second switch.

15. A nontransitory computer readable medium having software instruction stored thereon that, when executed by a processor, cause the processor to perform operations including:

detecting, at a first switch, a loop condition in a network;

generating, at the first switch, a localize loop message having an instance count and a path list, wherein the instance count contains a unique value corresponding to a given iteration that a localize loop message was transmitted in so as to provide a mechanism for serialization of shutting down ports, and wherein the instance count permits switches to determine the given iteration a given localize loop message was transmitted in, when more than one iteration of localize loop messages is transmitted;

setting, at the first switch, the instance count to a predetermined first value that serves as an initial identifier of a first iteration of localize loop messages being transmitted;

transmitting, from the first switch, the localize loop message to a second switch as the first iteration of localize loop messages being transmitted;

detecting, at the second switch, a loop in the network;

sending, from the second switch, a localize loop response message to the first switch:, incrementing, at the first switch, the predetermined first value of the instance count to generate an incremented instance count;

transmitting from the first switch a new localized loop message including the incremented instance count when the first switch receives a localize loop response from the second switch, wherein transmitting the new localize loop message comprises a second iteration of localize loop messages being transmitted;

determining when to stop sending localize loop messages after a time out period when the first switch does not receive any further localize loop responses from the second switch; and resuming, at the first switch, standard SLPP packet processing.

16. The nontransitory computer readable medium of claim 15, wherein the detecting a loop at the second switch, further comprises:

receiving, at the second switch, the localize loop message;

updating, at the second switch, the path list in the localize loop message;

transmitting, from the second switch, the localize loop message to ports associated with the second switch;

receiving, at the second switch, returned localize loop messages; and evaluating, at the second switch, a path list of the returned localize loop messages to determine if a two or more entries having identifiers associated with the second switch exist in the path list.

17. The nontransitory computer readable medium of claim 15, wherein the localize loop message includes a modified simple loop prevention loop message.

18. The nontransitory computer readable medium of claim 16, wherein the ports associated with the second switch include virtual local area network (VLAN) ports.

19. The nontransitory computer readable medium of claim 15, wherein the path list includes media access control (MAC) addresses.

20. The nontransitory computer readable medium of claim 16, wherein the localize loop message response includes an indication for ports which have been shut down, and wherein the operations further include:

generating, at the first switch, a subsequent localize loop message with an incremented instance count; and transmitting, from the first switch, the localize loop message with an incremented instance count to the second switch.

* * * * *